R. H. SHAW.
SEPARATORY FUNNEL.
APPLICATION FILED MAY 20, 1912.
1,049,411.
Patented Jan. 7, 1913.
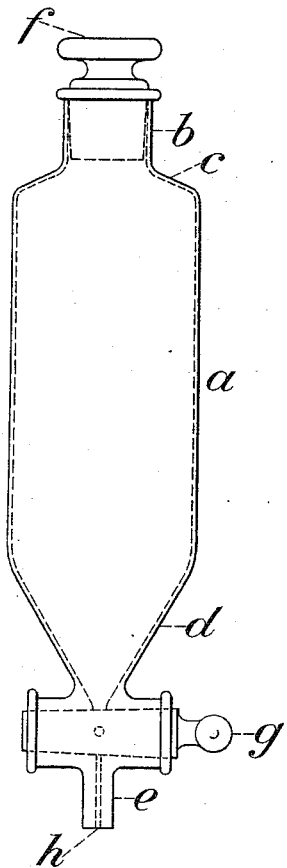
Witnesses:
Lloyd R. Harrison
Charles W. Boyle
Inventor:
Roscoe H. Shaw
per Geo. W. McCabe
Attorney.

UNITED STATES PATENT OFFICE.

ROSCOE H. SHAW, OF WASHINGTON, DISTRICT OF COLUMBIA.

SEPARATORY FUNNEL.

1,049,411.  Specification of Letters Patent.  Patented Jan. 7, 1913.

Application filed May 20, 1912. Serial No. 698,670.

(DEDICATED TO THE PUBLIC.)

*To all whom it may concern:*

Be it known that ROSCOE H. SHAW, a citizen of the United States, and an employee of the Department of Agriculture of the said United States, residing in the city of Washington, District of Columbia, (whose post-office address is Washington, District of Columbia,) prays that Letters Patent may be granted to me on a new and useful Improvement in Separatory Funnels.

This application is made under the act of March 3, 1883, chapter 143 (22 Stat., 625) and the invention herein described and claimed may be used by the Government of the United States or any of its officers or employees in the prosecution of work for the United States or by any person in the United States without the payment of any royalty thereon.

My invention relates to separatory funnels for use in determining the fat content of butter.

The object of my invention is to provide a funnel which is simple in construction and easily handled.

My apparatus is especially adapted for use in analytical work where it is necessary to determine with exactness the correct percentage of butter fat in butter.

The nature, characteristic features and scope of my invention will be more readily understood from the following description, taken in connection with the accompanying drawing, forming a part hereof, wherein I show a side perspective view of my apparatus.

Referring to the drawing, $a$, represents the barrel of the funnel, having a neck, $b$, and shoulders, $c$. The barrel, $a$, has a tapering bottom, as shown at $d$. The funnel is provided with a capillary stem, $e$, at its bottom and a stopper, $f$, for closing the opening at its top.

$g$, represents a stopcock arranged between the tapering bottom, $d$, of the barrel, $a$, and the capillary stem, $e$. $h$, indicates a bore hole in said capillary stem. The funnel is preferably constructed of good quality glass, well annealed.

The apparatus shown and described herein is particularly adapted for enabling analysts to ascertain with precision the correct content of butter fat in butter.

The novel feature of my apparatus is the arrangement at the bottom of the funnel of the capillary stem, $e$, having a bore hole or duct, $h$, which enables the analyst to separate the butter fat from the solution in manner as hereinafter shown.

In practice, I remove the stopper, $f$, from the funnel and place the sample of butter to be tested in the barrel, $a$. I then pour hot water in said barrel until the same is nearly filled to the neck, $b$, and the apparatus placed in a suitable holder where the stopcock, $g$, is readily accessible and the capillary stem, $e$, is free of obstruction and exposed to view. The combination is then subjected to a whirling operation for one minute on a centrifuge and then removed. The stopcock, $g$, is turned on and the aqueous solution permitted to flow or drain from the barrel, $a$, through the bore hole, $h$. When freed of this solution the stopcock, $g$, is adjusted and a mixture of equal parts of sulfuric acid and water is placed in the barrel, $a$, and the entire combination again subjected to the whirling process on a centrifuge. After this operation the combination is removed from the centrifuge and the stopcock, $g$, turned on to permit the acid solution to partially escape from the barrel, $a$, through the bore hole, $h$. I then subject the funnel to another whirling process on the centrifuge before removing the funnel from the holder. When the operation herein described has been thus far completed the duct, $h$, extending through the capillary stem, $e$, and stopcock, $g$, affords a channel for the butter fat to run slowly down to the tip of the capillary stem, $e$, and at the same time the channel permits the acid solution, if any remains in the funnel, to completely escape. The duct, $h$, retains the butter fat that descends from the barrel, $a$, and when such product reaches the tip of the capillary stem, $e$, the test is complete and it only remains for the analyst to weigh the separatory funnel containing the fat to determine the fat content in the butter tested. The weight of the separatory funnel and the fat, minus the previously ascertained weight of the empty and dry separatory funnel is the weight of the fat in the sample of butter analyzed. The percentage is calculated in the usual well known manner.

Having thus described my invention I claim:

In an apparatus for determining the content of butter fat in butter comprising a separatory funnel having an opening leading into a short capillary stem, said capillary hole in said stem adapted to hold back the heavier articles to be separated, substantially as specified.

In testimony whereof I affix my signature in the presence of two subscribed witnesses.

ROSCOE H. SHAW.

Witnesses:
CHARLES W. BOYLE,
EDWIN S. FRENCH.

Copies of this patent may be obtained for five cents each, by addressing the "Commissioner of Patents, Washington, D. C."